United States Patent
Park et al.

(10) Patent No.: US 9,972,876 B2
(45) Date of Patent: May 15, 2018

(54) METAL AIR BATTERY AND GAS DIFFUSION LAYER EQUIPPED THEREIN

(71) Applicant: Samsung Electronics Co., Ltd., Suwon-si, Gyeonggi-do (KR)

(72) Inventors: Jungock Park, Yongin-si (KR); Kyounghwan Choi, Suwon-si (KR); Mokwon Kim, Daejeon (KR); Joonhee Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 198 days.

(21) Appl. No.: 15/149,296

(22) Filed: May 9, 2016

(65) Prior Publication Data

US 2017/0054189 A1    Feb. 23, 2017

(30) Foreign Application Priority Data

Aug. 17, 2015  (KR) .................. 10-2015-0115417

(51) Int. Cl.
| | | |
|---|---|---|
| *H01M 12/08* | (2006.01) | |
| *H01M 4/88* | (2006.01) | |
| *H01M 12/02* | (2006.01) | |
| *H01M 4/86* | (2006.01) | |
| *H01M 4/38* | (2006.01) | |

(Continued)

(52) U.S. Cl.
CPC ......... *H01M 12/08* (2013.01); *H01M 4/8807* (2013.01); *H01M 12/02* (2013.01); *H01M 4/134* (2013.01); *H01M 4/382* (2013.01); *H01M 4/8668* (2013.01); *H01M 4/8673* (2013.01); *H01M 2004/027* (2013.01); *H01M 2004/8689* (2013.01); *H01M 2300/0082* (2013.01); *Y02E 60/128* (2013.01)

(58) Field of Classification Search
None
See application file for complete search history.

(56) References Cited

U.S. PATENT DOCUMENTS

| | | |
|---|---|---|
| 8,481,187 B2 | 7/2013 | Zhang et al. |
| 8,980,485 B2 | 3/2015 | Lanning et al. |

(Continued)

FOREIGN PATENT DOCUMENTS

KR    1020140105100 A    9/2014

*Primary Examiner* — Scott J Chmielecki
(74) *Attorney, Agent, or Firm* — Cantor Colburn LLP (57) ABSTRACT

A metal air battery includes at least one gas diffusion layer assembly; a positive electrode layer disposed on a surface of the at least one gas diffusion layer assembly, wherein the positive electrode layer is capable of using oxygen as an active material; a protective electrolyte membrane disposed on the positive electrode layer; and a negative electrode metal layer disposed on the protective electrolyte membrane, wherein the gas diffusion layer assembly includes a first gas diffusion layer and a second gas diffusion layer, wherein the second gas diffusion layer is disposed on a first surface and an opposite second surface of the first gas diffusion layer, and wherein a gas diffusivity of the first gas diffusion layer is greater than a gas diffusivity of the second gas diffusion layer. Also, the gas diffusion layer assembly described above, and a method of manufacturing a metal air battery including the gas diffusion layer assembly.

20 Claims, 5 Drawing Sheets (51) Int. Cl.
*H01M 4/134* (2010.01)
*H01M 4/02* (2006.01)

(56) References Cited

U.S. PATENT DOCUMENTS

| | | | |
|---|---|---|---|
| 2009/0023032 A1* | 1/2009 | Obata | H01M 4/8652 |
| | | | 429/524 |
| 2011/0003213 A1* | 1/2011 | Burchardt | H01M 8/0239 |
| | | | 429/402 |
| 2011/0027666 A1* | 2/2011 | Burchardt | B60L 11/1879 |
| | | | 429/406 |
| 2011/0236772 A1* | 9/2011 | Burchardt | H01M 4/8605 |
| | | | 429/403 |
| 2011/0236799 A1* | 9/2011 | Burchardt | H01M 2/1653 |
| | | | 429/534 |
| 2014/0106240 A1* | 4/2014 | Kotani | H01M 4/50 |
| | | | 429/405 |
| 2014/0234733 A1 | 8/2014 | Roev et al. | |
| 2014/0255799 A1 | 9/2014 | Anandan et al. | |
| 2015/0140452 A1* | 5/2015 | Park | H01M 12/06 |
| | | | 429/403 |

\* cited by examiner

FIG. 5

METAL AIR BATTERY AND GAS DIFFUSION LAYER EQUIPPED THEREIN

CROSS-REFERENCE TO RELATED APPLICATION

This application claims the benefit of and priority to Korean Patent Application No. 10-2015-0115417, filed on Aug. 17, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a metal air battery and a gas diffusion layer disposed therein, and more particularly, to a metal air battery having a high energy density and a gas diffusion layer disposed therein.

2. Description of the Related Art

A lithium air battery may include a negative electrode capable of intercalation/deintercalation of lithium ions, a positive electrode that can oxidize/reduce oxygen from the air, and an electrolyte interposed between the positive electrode and the negative electrode.

Since the lithium air battery may employ lithium itself as a negative electrode, and uses oxygen from the air as a positive electrode active material, the lithium air battery may have high capacity. The theoretical energy density per unit weight of the lithium air battery may be very high, about 3,500 watt-hours per kilogram (Wh/kg) or greater. Such an energy density of the lithium air battery is about 10 times greater than that of a lithium ion battery. Nonetheless the remains a need for improved materials to provide improved energy density.

SUMMARY

Provided is a metal air battery having improved energy density.

Provided is a gas diffusion layer assembly for a metal air battery, which is lightweight and has both suitable electrical conductivity and suitable gas diffusivity.

Additional aspects will be set forth in part in the description which follows and, in part, will be apparent from the description, or may be learned by practice of the presented exemplary embodiments.

According to an aspect of an exemplary embodiment, a metal air battery includes: at least one gas diffusion layer assembly; a positive electrode layer disposed on a surface of the at least one gas diffusion layer assembly, wherein the positive electrode layer is capable of using oxygen as an active material; a protective electrolyte membrane disposed on the positive electrode layer; and a negative electrode metal layer disposed on the protective electrolyte membrane, wherein the gas diffusion layer assembly includes a first gas diffusion layer and a second gas diffusion layer, wherein the second gas diffusion layer is disposed on a first surface and an opposite second surface of the first gas diffusion layer, and wherein a gas diffusivity of the first gas diffusion layer is greater than a gas diffusivity of the second gas diffusion layer.

The protective electrolyte membrane may be directly on the positive electrode layer, and the negative electrode metal layer may be directly on the protective electrolyte membrane.

The positive electrode layer, the protective electrolyte membrane, and the negative electrode metal layer include at least one fold, and the gas diffusion layer assembly may be disposed in a valley of the positive electrode layer.

A width of the gas diffusion layer assembly may be the same as or greater than a width of the negative electrode metal layer.

The second gas diffusion layer, the positive electrode layer, the protective electrolyte membrane, and the negative electrode metal layer include at least one fold, and the first gas diffusion layer may be disposed in a valley of the second gas diffusion layer, which is folded.

The first gas diffusion layer may include at least one selected from a woven fabric, a non-woven fabric, and a mesh.

A thickness of the first gas diffusion layer may be in a range of about 20 micrometers (µm) to about 200 µm, and a weight per unit area of the first gas diffusion layer may be in a range of about 1 milligram per square centimeter ($mg/cm^2$) to about 4 $mg/cm^2$.

The first gas diffusion layer may include a support.

The support may include at least one selected from a carbon sphere, a carbon rod, a hollow carbon sphere, a hollow carbon rod, an aerogel, a metal oxide sphere, a metal oxide rod, a hollow metal oxide sphere, and a hollow metal oxide rod.

An average diameter of the support may be in a range of about 20 µm to about 200 µm.

The second gas diffusion layer may be permeable to oxygen in a thickness direction thereof.

The second gas diffusion layer may include at least one selected from carbon fibers, carbon nanotubes, and a porous metal.

A thickness of the second gas diffusion layer may be in a range of about 3 µm to about 30 µm, and a weight per unit area of the second gas diffusion layer may be in a range of about 0.1 $mg/cm^2$ to about 2 $mg/cm^2$.

A weight per unit area of the gas diffusion layer assembly may be less than 4 $mg/cm^2$.

A weight per unit area of the gas diffusion layer assembly may be 2 $mg/cm^2$ or less.

The metal air battery may further include a positive electrode current collector including a plurality of holes, which is interposed between the positive electrode layer and the gas diffusion layer assembly.

According to another aspect of an exemplary embodiment, a gas diffusion layer assembly includes a first gas diffusion layer; and a second gas diffusion layer disposed on a first surface and an opposite second surface of the first gas diffusion layer, and wherein a gas diffusivity of the first gas diffusion layer is greater than a gas diffusivity of the second gas diffusion layer.

According to yet another aspect of an exemplary embodiment, a method of manufacturing a metal air battery includes: providing a negative electrode; disposing an electrolyte membrane on the negative electrode; disposing a positive electrode on the electrolyte membrane; and disposing a gas diffusion layer assembly on the positive electrode, wherein the gas diffusion layer assembly includes a first gas diffusion layer, and a second gas diffusion layer, wherein the second gas diffusion layer is disposed on a first surface and an opposite second surface of the first gas diffusion layer, and wherein a gas diffusivity of the first gas diffusion layer is greater than a gas diffusivity of the second gas diffusion layer.

The method of manufacturing a metal air battery may include wherein disposing a gas diffusion layer assembly on the positive electrode includes disposing a gas diffusion layer assembly to cover half of a surface of the positive electrode, and folding the positive electrode, the electrolyte membrane, and the negative electrode current collector 180 degrees together in the same direction so that the positive electrode is disposed on a first surface and on an opposite second surface of the gas diffusion layer assembly.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." As used herein, the term "and/or" includes any and all combinations of one or more of the associated listed items. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, and do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter with reference to attached drawings, a metal air battery according to an exemplary embodiment will be described in further detail. Like reference numerals in the drawings denotes like components, and sizes of components in the drawings may be exaggerated for clarity and convenience of explanation. In addition, exemplary embodiments described herein are illustrative purposes only, and various changes in form and details may be made therein. Throughout the specification, it will be understood that when a component is referred to as being "on the top of" or "on" another component, the component can be directly on the other component or indirectly thereon, i.e., an intervening layer can be present. Throughout the specification, it will be understood that a "first surface" and "the other" or "an opposite second surface" means two surfaces that are positioned opposite to each other, and a "first direction" and "the other" or "an opposite second direction" means two directions that are directed oppositely. Throughout the specification, it will be understood that a "first surface" and "an opposite second surface" means two surfaces that are positioned opposite to each other, and a "first direction" and "an opposite second direction" means two directions that are directed oppositely. Throughout the specification, it will be understood that the term "air" means atmospheric air, a combination of gases including oxygen, or pure oxygen gas.

In order to diffuse oxygen inside the cell of the lithium air battery, a gas diffusion layer may be placed between two positive electrodes that are adjacent to each other. Oxygen may move toward the positive electrode through the gas diffusion layer and react with lithium ions in the positive electrode. A gas diffusion layer that is currently used includes a carbonaceous material, such as carbon paper or carbon cloth. When such a material has a thickness of about 200 micrometers (μm) to about 400 μm, the weight per unit area thereof may be very high, e.g., 4 milligrams per square centimeter (mg/cm$^2$) to about 10 mg/cm$^2$.

Figure 1:
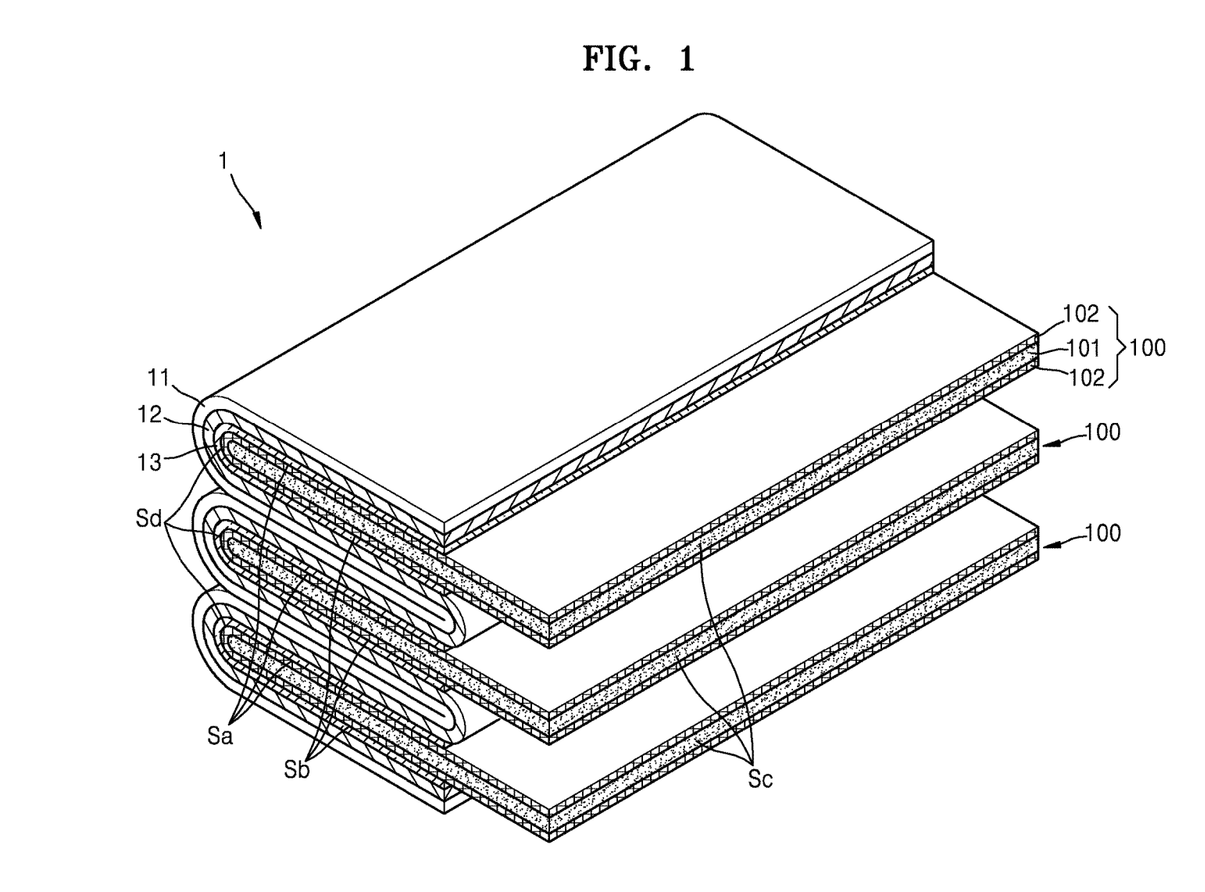
FIG. 1 illustrates a schematic view illustrating an embodiment of a metal air battery.

FIG. 1 illustrates a schematic view illustrating an embodiment of a metal air battery 1.

Referring to FIG. 1, the metal air battery 1 may include a gas diffusion layer assembly 100, a positive electrode layer 13, a protective electrolyte membrane 12, and a negative electrode metal layer 11.

The gas diffusion layer assembly 100 may serve to provide a path for oxygen in the air to contact the positive electrode layer 13. The gas diffusion layer assembly 100 may have a porous structure to smoothly diffuse external oxygen.

Referring to FIG. 1, the gas diffusion layer assembly 100 may include a first surface Sa, a second surface Sb facing the first surface Sa, and a plurality of side surfaces connecting the first surface Sa to the second surface Sb. A side surface Sc of the gas diffusion layer assembly 100 may be exposed to the outside.

The positive electrode layer 13, the protective electrolyte membrane 12, and the negative electrode metal layer 11 may be folded at least once so that the positive electrode layer 13 may be in contact with the first surface Sa and the second surface Sb of the gas diffusion layer 100. The gas diffusion layer 100 may be inserted in a valley of the folded positive electrode layer 13. For example, if the positive electrode layer 13, the protective electrolyte membrane 12, and the negative electrode metal layer 11 are folded twice or more, the positive electrode layer 13, the protective electrolyte membrane 12, and the negative electrode metal layer 11 may be alternately folded in a first direction, and then in an opposite second direction, as shown in FIG. 1.

The positive electrode layer 13, the protective electrolyte membrane 12, and the negative electrode metal layer 11 may be folded to have a constant width in the thickness direction thereof. Throughout the specification, a "width" and "length" of a component are distinguished by the size thereof, and a "width" may be shorter than a "length." In an embodiment in which a component or assembly is rectilinear, the length and width are perpendicular.

As described above, in a structure in which the positive electrode layer 13 is disposed on the first surface Sa and the second surface Sb of the gas diffusion layer assembly 100, the first surface Sa and the second surface Sb of the gas diffusion layer assembly 100 may not be exposed to the outside. Accordingly, supply of air to the gas diffusion layer assembly 100 may take place through all or some of side surfaces of the gas diffusion layer assembly 100. That is, supply of air to the gas diffusion layer assembly 100 may take place through at least one side surface Sc from among side surfaces of the gas diffusion layer assembly 100.

The metal air battery 1 may have a structure that may facilitate supply of air through side surfaces of the gas diffusion layer assembly 100, which are exposed to the outside.

Although it is not illustrated in the drawings, an external casing (not shown) may surround the remaining external surfaces of the negative electrode metal layer 11, the protective electrolyte membrane 12, the positive electrode layer 13, and the gas diffusion layer assembly 100, except for the exposed side surface Sc of the gas diffusion layer assembly 100.

The width of the gas diffusion layer assembly 100 may be greater than the width of the negative electrode metal layer 11. However, embodiments are not limited thereto, and the width of the gas diffusion layer assembly 100 may be the same as the width of the negative electrode metal layer 11.

The gas diffusion layer assembly 100 may include the first gas diffusion layer 101, and a second gas diffusion layer 102 disposed on a first surface and an opposite second surface of the first gas diffusion layer 101. The second gas diffusion layer 102 may be electrically conductive, and may have a through plane electrical conductivity of 1 Siemens per centimeter (Scm$^{-1}$) to 500 Scm$^{-1}$, or 10 Scm$^{-1}$ to 100 Scm$^{-1}$, and an in-plane conductivity of 0.1 Scm$^{-1}$ to 10 cm$^{-1}$, or 0.5 cm$^{-1}$ to 5 Scm$^{-1}$. Also, the second gas diffusion layer 102 may have an electrical conductivity which is 10 times to 10,000 times, or 100 times to 1000 times and electrical conductivity of the first gas diffusion layer 101.

The gas diffusivity of the first gas diffusion layer 101 may be greater than the gas diffusivity of the second gas diffusion layer 102. For example, the first gas diffusion layer 101 may have a gas permeability of 100 mL·mm/(cm$^2$·hr·mm) to 3000 mL·mm/(cm$^2$·hr·mm), or 500 mL·mm/(cm$^2$·hr·mm) to 2000 mL·mm/(cm$^2$·hr·mm), and may have a gas permeability which is 10% to 100%, or 20% to 50% greater than a gas permeability of the second gas diffusion layer 102.

As is further described above, the gas diffusion layer assembly 100 may include the first gas diffusion layer 101 and the second gas diffusion layer 102. Accordingly, the gas diffusion layer assembly 100 may be less dense, e.g., lighter, than a gas diffusion layer including a carbon paper, and may have both suitable electrical conductivity and suitable gas diffusivity. Therefore, the metal air battery 1 including the gas diffusion layer assembly 100 may provide improved energy density.

The first gas diffusion layer 101 may include at least one selected from a woven fabric, a non-woven fabric, and a mesh. The first gas diffusion layer 101 may have an electrical conductivity which is less than electrical conductivity of the second gas diffusion layer 102, and may be electrically insulating.

The woven fabric, the non-woven fabric, and the mesh may each independently include at least one polymer selected from a homopolymer, a block copolymer, and a random copolymer. For example, the woven fabric, the non-woven fabric, and the mesh may each independently include at least one selected from polyethylene, polypropylene, polyethylene terephthalate, polyphenylene sulfide, poly (2-vinylpyridine), polytetrafluoroethylene, tetrafluoroethylene-hexafluoropropylene copolymer, polychlorotrifluoroethylene, perfluoroalkoxy copolymer, fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, polyalkyldiol diacrylate, polyalkyldiol dimethacrylate, polydivinylbenzene, polyether, polycarbonate, polyamide, polyester, polyvinylchloride, polyimide, polycarboxylic acid, polysulfonic acid, polyvinyl alcohol, polysulfone, polystyrene, polyethylene, polypropylene, poly(p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, a copolymer of vinylidene fluoride and hexafluoropropylene, poly(vinylacetate), poly(vinyl butyral-co-vinyl alcohol-co-vinyl acetate), poly(methylmethacrylate-co-ethyl acrylate), polyacrylonitrile, polyvinyl chloride-co-vinyl acetate, poly(1-vinylpyrrolidone-co-vinyl acetate), polyvinylpyrrolidone, polyacrylate, polymethacrylate, polyurethane, polyvinylether, acrylonitrile-butadiene rubber, styrene-butadiene rubber, acrylonitrile-butadiene-styrene rubber, sulfonated styrene/ethylene-butylene triblock copolymer, a polymer obtained from at least one acrylate monomer selected from ethoxylated neopentyl glycol diacrylate, ethoxylated bisphenol A diacrylate, ethoxylated aliphatic urethane acrylate, and ethoxylated alkylphenol acrylate, and (C1 to C12 alkyl) acrylate, polyvinylalcohol, polyimide, epoxy resin, and other acryl-based polymers, which include acrylic, methacrylic, (C1 to C20 alkyl) acrylate, and (C1 to C20 alkyl)methacrylate polymers.

The non-woven fabric may be prepared, for example, by filtering the primary material fibers and binder fibers dispersed in water in a form of a circular mesh or a long mesh using a paper machine. Then, the filtrate may be dried using a drier, thereby preparing the non-woven fabric. In addition, in order to remove fluff from the non-woven fabric or improve mechanical properties of the non-woven fabric, the non-woven fabric may be sandwiched between two rolls, and then may undergo heat-treating under a high pressure.

A thickness of the first gas diffusion layer 101 may be in a range of about 10 µm to about 400 µm, about 20 µm to about 200 µm, or about 40 µm to about 100 µm, and a weight per unit area of the first gas diffusion layer 101 may be in a range of about 0.1 milligrams per square centimeter (mg/cm$^2$) to about 10 mg/cm$^2$, about 1 mg/cm$^2$ to about 4 mg/cm$^2$, or about 1.5 mg/cm$^2$ to about 3 mg/cm$^2$.

Figure 2A:
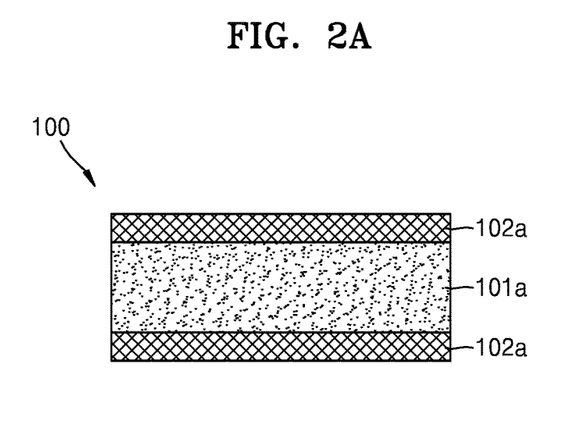
FIGS. 2A, 2B, and 2C illustrate schematic cross-sectional views of embodiments of a gas diffusion layer assembly of the metal air battery shown in FIG. 1.
Figure 2B:
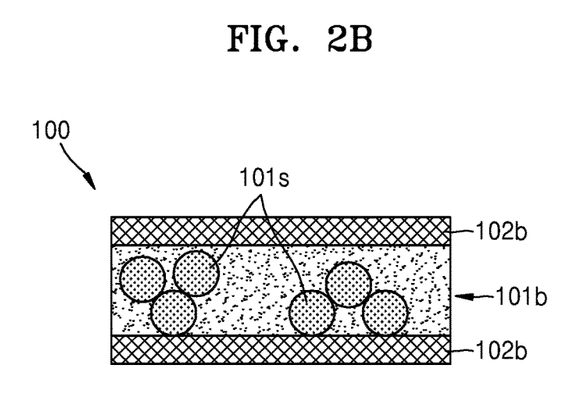
Figure 2C:
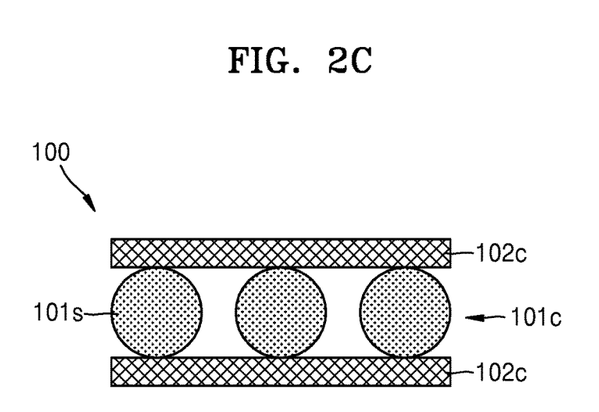

The first gas diffusion layer 101 may include a support (101s in FIG. 2B and FIG. 2C). In particular, the first gas diffusion layer 101 may include not only at least one selected from the woven fabric, the non-woven fabric, and the mesh, but also the support (Refer to FIG. 2B). Alternatively, the woven fabric, the non-woven fabric, and the mesh may be omitted from the first gas diffusion layer 101 and the first gas diffusion layer 101 may only comprise the support (FIG. 2C).

The support may be interposed between a pair of the second gas diffusion layers 102 that are arranged to face each other, serving to provide a valley for air to be diffused.

The support may include at least one selected from a carbon sphere, a carbon rod, a hollow carbon sphere, a hollow carbon rod, an aerogel, a metal oxide sphere, a metal oxide rod, a hollow metal oxide sphere, and a hollow metal oxide rod.

An average diameter of the support may be in a range of about 10 µm to about 400 µm, about 20 µm to about 200 µm, or about 40 µm to about 100 µm.

The amount of the support may be in a range of 0 weight percent (wt %) to about 100 wt %, about 10 wt % to about 90 wt %, or about 20 wt % to about 80 wt % of the first gas diffusion layer 101.

The second gas diffusion layer 102 may have suitable oxygen permeability in a thickness direction thereof. Accordingly, the second gas diffusion layer 102 may include a plurality of holes that are connected or communicated in the thickness direction thereof.

The second gas diffusion layer 102 may include at least one selected from carbon fibers, carbon nanotubes, and a porous metal.

A thickness of the second gas diffusion layer 102 may be in a range of about 1 µm to about 50 µm, about 3 µm to about 30 µm, or about 5 µm to about 20 µm, and a weight per unit area may be in a range of about 0.01 mg/cm$^2$ to about 5 mg/cm$^2$, about 0.1 mg/cm$^2$ to about 2 mg/cm$^2$, or about 0.5 mg/cm$^2$ to about 1.5 mg/cm$^2$.

The second gas diffusion layer 102 has suitable electrical conductivity. Therefore, the second gas diffusion layer 102 is in contact with a positive electrode current collector (not shown) so that current generated from the positive electrode layer 13 may be transferred to the positive electrode current collector. In addition, since the second gas diffusion layer 102 has suitable oxygen permeability, oxygen in the air flowing in from the outside to the first gas diffusion layer 101 may be transferred to the positive electrode layer 13.

The weight per unit area of the gas diffusion layer assembly 100 may be less than 4 mg/cm$^2$. For example, the weight per unit area of the gas diffusion layer assembly 100 may be 3 mg/cm$^2$ or less, or 2 mg/cm$^2$ or less.

FIGS. 2A to 2C illustrate schematic cross-sectional views of embodiments of the gas diffusion layer assembly 100 of the metal air battery 1 shown in FIG. 1.

The gas diffusion layer assembly 100 of FIG. 2A may include a first gas diffusion layer 101a including a woven fabric, a non-woven fabric, a mesh, or a combination thereof, except for a support, and a pair of second gas diffusion layers 102a disposed on a first surface and an opposite second surface of the first gas diffusion layer 101a, respectively.

The gas diffusion layer assembly 100 of FIG. 2B may include a first gas diffusion layer 101b including the support 101s as well as at least one selected from a woven fabric, a non-woven fabric, and a mesh, and a pair of second gas diffusion layers 102b disposed on a first surface and an opposite second surface of the first gas diffusion layer 101b, respectively.

The gas diffusion layer 100 of FIG. 2C may include a first gas diffusion layer 101c including only the support 101s and not including the woven fabric, the non-woven fabric, and the mesh, and a pair of second gas diffusion layers 102c disposed on a first surface and an opposite second surface of the first gas diffusion layer 101c, respectively.

Figure 3A:
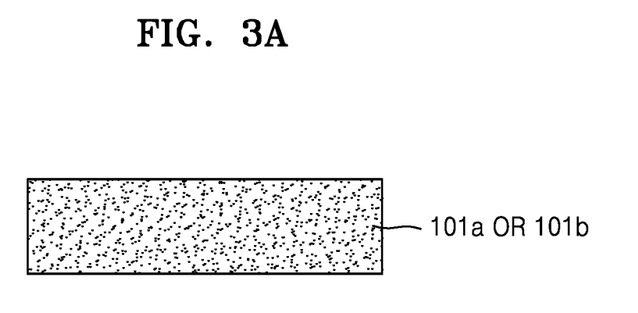
FIGS. 3A and 3B illustrate schematic plan views of embodiments of the first gas diffusion layer that are shown in FIGS. 2A to 2C, respectively.
Figure 3B:
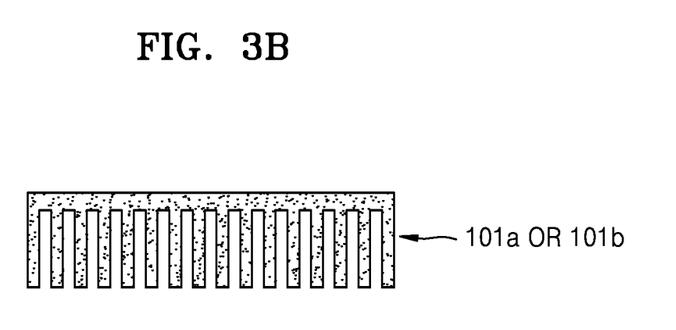

FIGS. 3A and 3B illustrate schematic plan views of embodiments of the first gas diffusion layers 101a and 101b that are shown in FIGS. 2A and 2B, respectively.

The first gas diffusion layer 101a and 101b shown in FIG. 3A may have a top surface which may be rectilinear, e.g., having a rectangular shape and a bottom surface which may also be rectilinear, e.g., having a rectangular shape.

The first gas diffusion layer 101a and 101b shown in FIG. 3B may have a top surface of a comb shape and a bottom surface of a comb shape. However, embodiments are not limited thereto. The first gas diffusion layer 101a and 101b may have a top surface and a bottom surface of various shapes having at least one cut portion for reducing the weight.

The positive electrode layer 13 may be disposed on the first surface Sa and the second surface Sb of the gas diffusion layer assembly 100.

For example, the positive electrode layer 13, as one layer, may be folded to surround at least three surfaces of the gas diffusion layer assembly 100. The positive electrode layer 13 may be folded to face the first surface Sa, the second surface Sb, and a side surface Sd of the gas diffusion layer assembly 100. The negative electrode metal layer 11 and the protective electrolyte membrane 12 may also be folded in the same or similar manner with that of the positive electrode layer 13.

The positive electrode layer 13 may include an electrolyte for conducting metal ions, a catalyst for oxidation and reduction of oxygen, a conductive agent, and a binder. For example, the electrolyte, the catalyst, the conductive agent, and the binder may be mixed with each other, and then a solvent may be added thereto to prepare a positive electrode slurry. The protective electrolyte membrane 12 may be coated with the positive electrode slurry, and then dried to thereby prepare the positive electrode layer 13.

The electrolyte may include a lithium salt, such as at least one selected from $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, and lithium bis(trifluoromethanesulfonyl)imide (LiTFSI). Alternatively, the electrolyte may include another metal salt, such as at least one selected from $AlCl_3$, $MgCl_2$, NaCl, KCl, NaBr, KBr, and $CaCl_2$ as well as the above described lithium salt.

The conductive agent may include at least one selected from a porous carbonaceous material, a conductive metal material, and a conductive organic material. For example, the carbonaceous material may include at least one selected from carbon black, graphite, graphene, activated carbon, carbon fibers, and carbon nanotubes. The conductive metal material may be, for example, used in a form of a metal powder.

The catalyst may include at least one selected from platinum (Pt), gold (Au), silver (Ag), manganese (Mn), nickel (Ni), and cobalt (Co), and an oxide thereof.

In addition, the binder may include at least one selected from polytetrafluoroethylene (PTFE), polypropylene, polyvinylidene difluoride (PVDF), polyethylene, and styrene-butadiene rubber.

The protective electrolyte membrane 12 may serve to transfer metal ions to the positive electrode layer 13. To this end, the protective electrolyte membrane 12 may include an electrolyte formed by dissolving a metal salt in a solvent. The electrolyte may be a solid phase including a polymer-based electrolyte, an inorganic-based electrolyte, or a composite electrolyte, which is a mixture thereof. In addition, the electrolyte may be prepared in a flexible form.

The metal salt may include the above described lithium salt, or the metal salt may include another metal salt, such as at least one selected from $AlCl_3$, $MgCl_2$, NaCl, KCl, NaBr, KBr, and $CaCl_2$ as well as the lithium salt.

The solvent may be any suitable material that may dissolve the lithium salt and the other metal salt.

In addition, the protective electrolyte membrane 12 may further include a separator for preventing oxygen from permeation and having suitable ionic conductivity. The separator may be a polymer-based separator that is bendable. For example, the separator may be a non-woven polymer fabric, such as a non-woven fabric including polypropylene material or a non-woven fabric including polyphenylene sulfide material or a porous film including an olefin-based resin, such as polyethylene or polypropylene. The separator and the electrolyte may be formed as separate layers; however, the protective electrolyte membrane 12 may be formed as a single layer if desired, for example by impregnating the electrolyte into holes of a porous separator. For example, an electrolyte formed by mixing polyethylene oxide (PEO) and LiTFSI may be impregnated into holes of the porous separator to thereby prepare the protective electrolyte membrane 12.

The negative electrode metal layer 11 may be suitable for intercalation/deintercalation of metal ions, and the negative electrode metal layer 11 may be disposed on the protective electrolyte membrane 12.

The negative electrode metal layer 11 may include, for example, at least one selected from lithium (Li), sodium (Na), zinc (Zn), potassium (K), calcium (Ca), magnesium (Mg), iron (Fe), and aluminum (Al), and an alloy thereof.

The negative electrode metal layer 11 may include, for example, an alloy of a lithium metal and other metals. That is, the negative electrode metal layer 11 may include a lithium alloy. Examples of the other metal include at least one selected from Si, Sn, Al, Ge, Pb, Bi, Sb, a Si—Y' alloy (where Y' may be an alkali metal, an alkaline earth metal, a Group 13 element, a Group 14 element, a transition metal, and a rare earth element, except for Si), a Sn—Y" alloy (where Y" is at least one selected from an alkali metal, an alkaline earth metal, a Group 13 element, a Group 14 element, a transition metal, and a rare earth element, except for Sn) or a combination thereof. Y' and Y" may each independently be at least one selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), and polonium (Po). Examples of the lithium alloy may include at least one selected from a lithium aluminum alloy, a lithium silicon alloy, a lithium tin alloy, a lithium silver alloy, and a lithium lead alloy.

Although it is not illustrated in FIG. 1, the metal air battery 1 may further include a positive electrode current collector interposed between the positive electrode layer 13 and the gas diffusion layer assembly 100 and including a plurality of holes. The positive electrode current collector may include at least one selected from a perforated metal, a punched metal, a porous metal, a foamed metal, a mesh metal. However, the positive electrode current collector is not necessarily limited thereto, and any suitable metal or alloy including a plurality of holes may be used as the positive electrode current collector.

The positive electrode current collector may include a gas flow path passing therethrough. Since the positive electrode current collector includes a gas flow path, air provided from the gas diffusion layer assembly 100 may be provided to the positive electrode layer 13 through the gas flow path. The shape of the gas flow path is not particularly limited. The gas flow path may be formed by a plurality of holes being connected to each other or by a through hole.

The porosity of the positive electrode current collector may be 50% or more, 55% or more, 60% or more, 70% or more, 75% or more, or 80% or more. The porosity of the positive electrode current collector indicates a percentage of the volume of holes based on the entire volume of the positive electrode current collector. As the porosity of the positive electrode current collector increases, the flow of gas is increased, and the weight of the positive electrode current collector decreases.

Although it is not illustrated in FIG. 1, the metal air battery 1 may further include a negative electrode current collector disposed on a surface of the negative electrode metal layer 11.

The negative electrode current collector and the negative electrode metal layer 11 may be integrally formed as one. Alternatively, the negative electrode current collector may be formed separately from the negative electrode metal layer 11.

The negative electrode current collector may be an electrically conductive substrate.

The negative electrode current collector may include at least one selected from stainless steel, copper, nickel, iron, and cobalt.

The metal air battery 1 may be a metal primary battery or a metal secondary battery. In addition, the shape of the metal air battery 1 is not particularly limited. For example, the metal air battery 1 may be in a coin shape, a button shape, a sheet shape, a stacked shape, a cylindrical shape, a flat shape, or a cone shape. In addition, the metal air battery 1 may be used as a large-scale battery, which is suitable for use in an electric vehicle.

Figure 4:
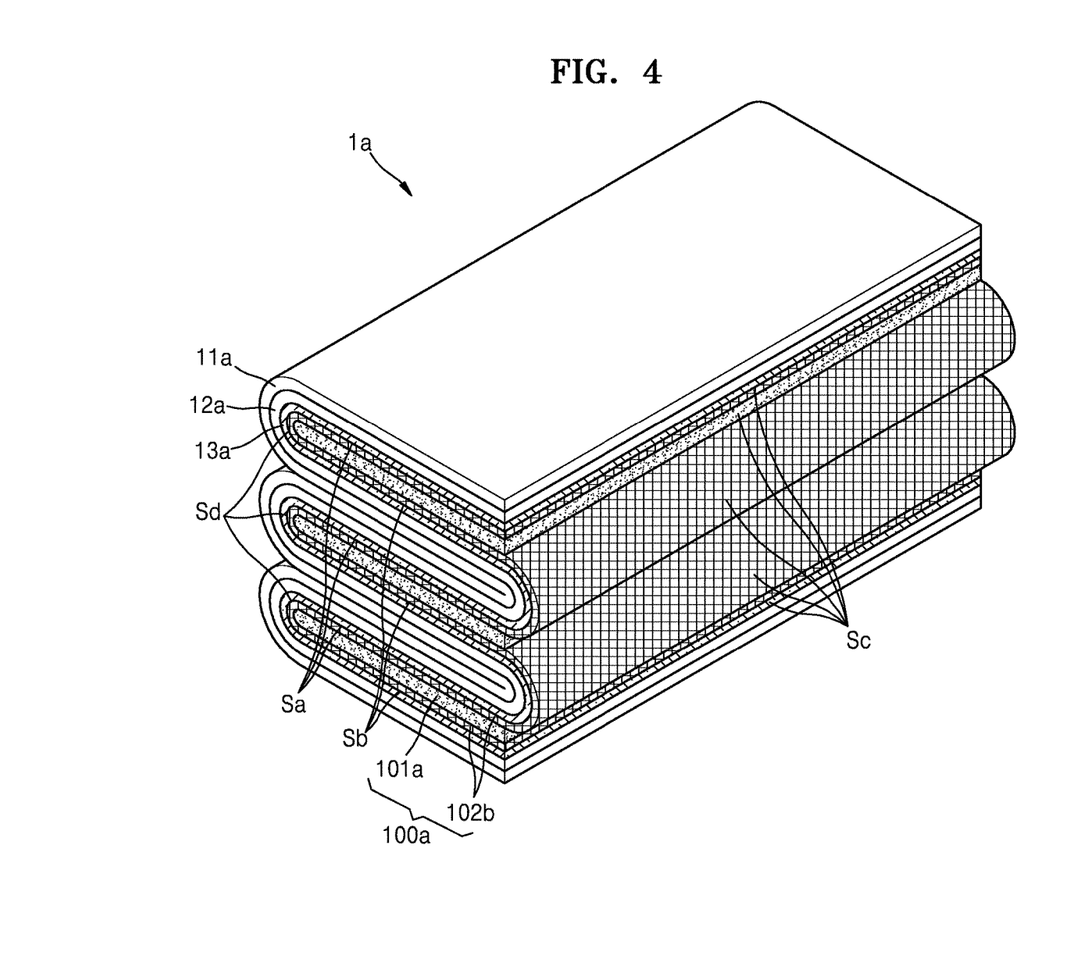
FIG. 4 illustrates a schematic perspective view of another embodiment of a metal air battery.

FIG. 4 illustrates a schematic perspective view of an embodiment of a metal air battery 1a.

Referring to FIG. 4, the metal air battery 1a may include a gas diffusion layer assembly 100a, a positive electrode layer 13a, a protective electrolyte membrane 12a, and a negative electrode metal layer 11a.

The gas diffusion layer assembly 100a may include the first surface Sa, the second surface Sb facing the first surface Sa, and a plurality of side surfaces connecting the first surface Sa to the second surface Sb. At least one side surface Sc of the gas diffusion layer assembly 100a may be exposed to the outside.

In addition, the gas diffusion layer assembly 100a may further include a first gas diffusion layer 101a and a second gas diffusion layer 102b.

The metal air battery 1a of FIG. 4 is different from the metal air battery 1 of FIG. 1 in that the second gas diffusion layer 102b, the positive electrode layer 13a, the protective electrolyte membrane 12a, and the negative electrode metal layer 11a may be folded at least once so that the positive electrode layer 13a may be in contact with the first surface Sa and the second surface Sb of the gas diffusion layer assembly 100a, and the first gas diffusion layer 101a may be inserted into a valley of the folded second gas diffusion layer 102b. In detail, in the metal air battery 1 of FIG. 1, the positive electrode layer 13, the protective electrolyte membrane 12, and the negative electrode metal layer 11 may be folded while the gas diffusion layer assembly 100 may not be folded. Whereas, in the metal air battery 1a of FIG. 4, not only the positive electrode layer 13a, the protective electrolyte membrane 12a, and the negative electrode metal layer 11a may be folded, but also the second gas diffusion layer 102b of the gas diffusion layer assembly 100a may be folded while the first gas diffusion layer 101a of the gas diffusion layer assembly 100a may not be folded. Accordingly, in the metal air battery 1 of FIG. 1, the first gas diffusion layer 101 and a pair of the second gas diffusion layers 102 included in the gas diffusion layer assembly 100 may be three separate layers. However, in the metal air battery 1a of FIG. 4, the first gas diffusion layer 101a included in the gas diffusion layer assembly 100a may be a separate layer from the second gas diffusion layer 102b, and the second gas diffusion layer 102b may not be two separate layers but a single layer. Therefore, the single layer of the second gas diffusion layer 102b may be folded to be disposed on both a first surface and an opposite second surface of the first gas diffusion layer 101a. If the second gas diffusion layer 102b, the positive electrode layer 13a, the protective electrolyte membrane 12a, and the negative electrode metal layer 11a are folded twice or more, the second gas diffusion layer 102b, the positive electrode layer 13a, the protective electrolyte membrane 12a, and the negative electrode metal layer 11a may be alternately folded in a first direction, and then in an opposite second direction, as shown in FIG. 4.

The material and function of the gas diffusion layer assembly 100a, the positive electrode layer 13a, the protective electrolyte membrane 12a, and the negative electrode metal layer 11a shown in FIG. 4 may be the same or similar with those of the gas diffusion layer assembly 100, the positive electrode layer 13, the protective electrolyte membrane 12, and the negative electrode metal layer 11 shown in FIG. 1. Therefore, detailed descriptions thereof will not be repeated.

The metal air battery will now be described in greater detail with reference to the following examples. However, the following examples are for illustrative purposes only and are not intended to limit the scope of the inventive concept.

EXAMPLES

Preparation of Lithium Air Battery

Examples 1 to 4 and Comparative Example 1: Preparation of Lithium Air Battery Preparation of Positive Electrode 16.32 grams (g) of polyethylene oxide (PEO, weight average molecular weight (Mw)=600,000 Daltons, Aldrich, 182028) was dissolved in 150 milliliters (mL) of acetonitrile to obtain a PEO solution. Then, LiTFSi was added to the PEO solution such that a mole ratio of [EO] to [Li] was 18 to 1, and then the resulting mixture was stirred. The solution was poured onto a polytetrafluoroethylene (PTFE) dish and dried in a drying room at room temperature (about 25° C.) for 2 days, and then was vacuum-dried at 80° C. overnight, thereby obtaining a positive electrode electrolyte film without a solvent.

Carbon black (Printex®, available from Orion Engineered Chemicals, USA) was vacuum-dried (at a temperature of about 120° C., for 24 hours).

The carbon black, a PTFE binder, and propylene glycol was weighed at a predetermined weight ratio, and then was subject to mechanical kneading and roll pressing, to thereby be manufactured to have a thickness of about 30 μm. The resulting material was dried in an oven at a temperature of about 60° C., thereby completing the manufacture of a rectangular positive electrode of an area of 6 square centimeters ($cm^2$) such as with dimensions of 2 cm×3 cm. The positive electrode electrolyte film was placed on the positive electrode, and then was hot-pressed at a temperature of about 120° C. to impregnate the electrolyte into the positive electrode. The weight ratio of the carbon black to a gel electrolyte in the positive electrode impregnated with the electrolyte was about 1:2.5, and the weight ratio of the carbon black and the PTFE binder was about 1:0.2. The weight of the positive electrode impregnated with the electrolyte was about 3 mg/cm².

Preparation of Electrolyte Membrane

A first surface and an opposite second surface of a porous separator (available from Celgard®) was coated with the same solution as used in the preparation of the positive electrode electrolyte film, and then was vacuum-dried in an oven at a temperature of about 120° C. overnight, thereby obtaining a solid electrolyte membrane without a solvent. The obtained solid electrolyte membrane was hot-pressed at a temperature of about 120° C. to impregnate an electrolyte into the porous separator, thereby obtaining an electrolyte membrane. The thickness of the electrolyte membrane was about 40 μm to about 50 μm.

Preparation of Lithium-Air Battery

Lithium metal (2.0 cm×3.0 cm) having a thickness of about 30 μm was placed on a negative electrode current collector (2.0 cm×3.0 cm). Then, the electrolyte membrane (2.2 cm×3.2 cm) was placed on the lithium metal.

The positive electrode (2 cm×3 cm) was placed on the electrolyte membrane. Then, a gas diffusion layer assembly (1.5 cm×3 cm) was placed on the positive electrode for the gas diffusion layer assembly to cover half of the surface of the positive electrode.

Thereafter, for the surface of the positive electrode to be in contact with the surface of the gas diffusion layer assembly, the positive electrode, the electrolyte membrane, the lithium metal, and the negative electrode current collector was folded 180 degrees, thereby completing the manufacture of a lithium air battery.

The lithium air battery is substantially the same as the lithium air battery of FIG. 1, except that the positive electrode, the electrolyte membrane, the lithium metal, and the negative electrode current collector are folded only once. In the lithium air battery of FIG. 1, the negative electrode current collector is omitted. Air is provided through side surfaces of the gas diffusion layer.

Details of the gas diffusion layer assemblies used in Examples 1 to 4 and Comparative Example 1 are as shown in Table 1.

TABLE 1

| | | Example 1 | Example 2 | Example 3 | Example 4 | Comparative Example 1 |
|---|---|---|---|---|---|---|
| Constitution | | triple layers | | | | Single layer |
| | | FIG. 2A + FIG. 3A | FIG. 2B + FIG. 3A | FIG. 2B + FIG. 3B | FIG. 2C | |
| Components | The first gas diffusion layer | A non-woven fabric*¹ 100 parts by weight | A non-woven fabric 100 parts by weight + a support*² 15 parts by weight | A non-woven fabric 100 parts by weight + a support 15 parts by weight | a support 100 parts by weight | Carbon paper*⁴ 100 parts by weight |
| | The second gas diffusion layer | A CNT sheet *³ 100 parts by weight | A CNT sheet 100 parts by weight | A CNT sheet 100 parts by weight | A CNT sheet 100 parts by weight | |
| thickness (μm) | The total thickness | 90 | 90 | 90 | 90 | 180 |
| | The first gas diffusion layer | 80 | 80 | 80 | 80 | |
| | The second gas diffusion layer | 10 | 10 | 10 | 10 | |

*¹manufacturer: Hirose Paper Mfg Co., Ltd., product No.: 05TH-12, material: polyester, the weight per unit area: 2 mg/cm²
*²manufacturer: Uni-Am Co., Ltd., product No.: OMC-N, material: carbon, the weight per unit area: 0.3 mg/cm², average diameter: 20 μm
*³self-manufactured, the weight per unit area: 0.4 mg/cm²
*⁴manufacturer: SGL Co., Ltd., product No.: 25BA, the weight per unit area: 4.3 mg/cm²

Evaluation Example 1: Evaluation of Discharge Characteristics

At a temperature of about 60° C., under 1 atmosphere (atm) oxygen, the lithium air batteries manufactured in Examples 1 to 2 and Comparative Example 1 were discharged with a constant current of about 0.24 mA/cm² until the voltage reached 1.7 V (vs. Li). Then, a discharge capacity was measured. The results thereof are shown in FIG. 5.

Figure 5:
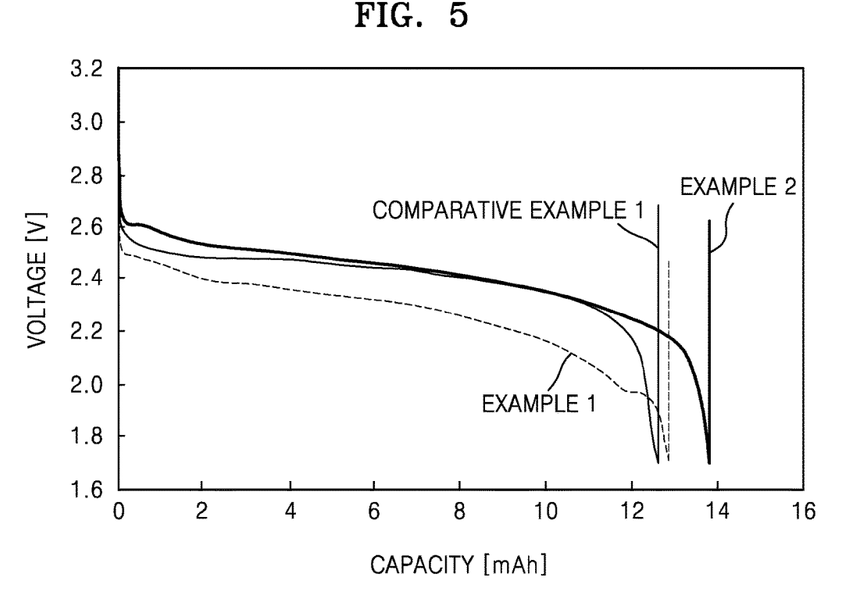
FIG. 5 is a graph of voltage (Volts, V) versus capacity (milliAmpere-hours, mAh) illustrating a discharge curve of the metal air batteries manufactured in Examples 1 and 2 and Comparative Example 1.

Referring to FIG. 5, it was found that the lithium air batteries manufactured in Examples 1 to 2 and the lithium air battery manufactured in Comparative Example 1 had similar discharge capacity.

Evaluation Example 2: Energy Density Evaluation

Energy densities of the lithium air batteries manufactured in Examples 1 to 2 and Comparative Example 1 were evaluated based on the results of Evaluation Example 1: Evaluation of discharge characteristics. The results thereof are shown in Table 2.

TABLE 2

|  | Example 1 | Example 2 | Comparative Example 1 |
|---|---|---|---|
| Energy density (Watt-hours per kilogram, Wh/kg) | 493 | 537 | 450 |

Referring to Table 2, it was found that the lithium air batteries manufactured in Examples 1 to 2 had improved energy density compared to the lithium air battery manufactured in Comparative Example 1.

The metal air battery according to an exemplary embodiment may have a high energy density.

According to an exemplary embodiment, the gas diffusion layer assembly for metal air batteries may be lightweight and have both improved electrical conductivity and improved gas diffusivity.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal air battery comprising:
   at least one gas diffusion layer assembly;
   a positive electrode layer disposed on a surface of the at least one gas diffusion layer assembly, wherein the positive electrode layer is capable of using oxygen as an active material;
   a protective electrolyte membrane disposed on the positive electrode layer; and
   a negative electrode metal layer disposed on the protective electrolyte membrane,
   wherein the gas diffusion layer assembly comprises
     a first gas diffusion layer, and
     a second gas diffusion layer,
   wherein the second gas diffusion layer is disposed on a first surface and an opposite second surface of the first gas diffusion layer, and
   wherein a gas diffusivity of the first gas diffusion layer is greater than a gas diffusivity of the second gas diffusion layer.

2. The metal air battery of claim 1,
   wherein the positive electrode layer, the protective electrolyte membrane, and the negative electrode metal layer comprise at least one fold, and
   wherein the gas diffusion layer assembly is disposed in a valley of the positive electrode layer.

3. The metal air battery of claim 2, wherein a width of the gas diffusion layer assembly is the same as or greater than a width of the negative electrode metal layer.

4. The metal air battery of claim 1,
   wherein the second gas diffusion layer, the positive electrode layer, the protective electrolyte membrane, and the negative electrode metal layer comprise at least one fold, and
   wherein the first gas diffusion layer is disposed in a valley of the second gas diffusion layer.

5. The metal air battery of claim 1, wherein the first gas diffusion layer comprises at least one selected from a woven fabric, a non-woven fabric, and a mesh.

6. The metal air battery of claim 1,
   wherein a thickness of the first gas diffusion layer is in a range of about 20 micrometers to about 200 micrometers, and
   wherein a weight per unit area of the first gas diffusion layer is in a range of about 1 milligram per square centimeter to about 4 milligrams per square centimeter.

7. The metal air battery of claim 1, wherein the first gas diffusion layer comprises a support.

8. The metal air battery of claim 7, wherein the support comprises at least one selected from a carbon sphere, a carbon rod, a hollow carbon sphere, a hollow carbon rod, an aerogel, a metal oxide sphere, a metal oxide rod, a hollow metal oxide sphere, and a hollow metal oxide rod.

9. The metal air battery of claim 7, wherein an average diameter of the support is in a range of about 20 micrometers to about 200 micrometers.

10. The metal air battery of claim 1, wherein the second gas diffusion layer is permeable to oxygen in a thickness direction thereof.

11. The metal air battery of claim 1, wherein the second gas diffusion layer comprises at least one selected from carbon fibers, carbon nanotubes, and a porous metal.

12. The metal air battery of claim 1,
    wherein a thickness of the second gas diffusion layer is in a range of about 3 micrometers to about 30 micrometers, and
    wherein a weight per unit area of the second gas diffusion layer is in a range of about 0.1 milligram per square centimeter to about 2 milligrams per square centimeter.

13. The metal air battery of claim 1, wherein a weight per unit area of the gas diffusion layer assembly is less than 4 milligrams per square centimeter.

14. The metal air battery of claim 13, wherein a weight per unit area of the gas diffusion layer assembly is 2 milligrams per square centimeter or less.

15. The metal air battery of claim 1, wherein the second gas diffusion layer has an electrical conductivity which is greater than an electrical conductivity of the first gas diffusion layer.

16. A gas diffusion layer assembly comprising:
    a first gas diffusion layer; and
    a second gas diffusion layer disposed on a first surface and an opposite second surface of the first gas diffusion layer, and
    wherein a gas diffusivity of the first gas diffusion layer is greater than a gas diffusivity of the second gas diffusion layer.

17. The gas diffusion layer assembly of claim 16, wherein the second gas diffusion layer has an electrical conductivity which is greater than an electrical conductivity of the first gas diffusion layer.

18. A method of manufacturing a metal air battery, the method comprising
    providing a negative electrode;
    disposing an electrolyte membrane on the negative electrode;
    disposing a positive electrode on the electrolyte membrane; and
    disposing a gas diffusion layer assembly on the positive electrode,
    wherein the gas diffusion layer assembly comprises
      a first gas diffusion layer, and
      a second gas diffusion layer, wherein the second gas diffusion layer is disposed on a first surface and an opposite second surface of the first gas diffusion layer, and wherein a gas diffusivity of the first gas diffusion layer is greater than a gas diffusivity of the second gas diffusion layer.

19. The method of claim 18, wherein the second gas diffusion layer has an electrical conductivity which is greater than an electrical conductivity of the first gas diffusion layer.

20. The method of claim 18, wherein the disposing a gas diffusion layer assembly on the positive electrode comprises disposing a gas diffusion layer assembly to cover one-half of a surface of the positive electrode, and folding the positive electrode, the electrolyte membrane, and the negative electrode current collector 180 degrees together in a same direction so that the positive electrode is disposed on a first surface and on an opposite second surface of the gas diffusion layer assembly.

* * * * *